(12) United States Patent
Juliato et al.

(10) Patent No.: US 11,386,204 B2
(45) Date of Patent: Jul. 12, 2022

(54) AGILE RECONFIGURABLE APPROACH FOR REAL-TIME REPLACEMENT OF ON-CHIP SAFETY-CRITICAL MODULES

(71) Applicant: Intel Corporation, Santa Clara, CA (US)

(72) Inventors: Marcio Juliato, Portland, OR (US); Manoj Sastry, Portland, OR (US); Shabbir Ahmed, Beaverton, OR (US); Christopher Gutierrez, Hillsboro, OR (US); Qian Wang, Portland, OR (US); Vuk Lesi, Cornelius, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/031,140

(22) Filed: Sep. 24, 2020

(65) Prior Publication Data
US 2021/0026955 A1    Jan. 28, 2021

(51) Int. Cl.
*G06F 21/55* (2013.01)
*G06F 21/85* (2013.01)
*G06F 21/71* (2013.01)

(52) U.S. Cl.
CPC ............ *G06F 21/554* (2013.01); *G06F 21/71* (2013.01); *G06F 21/85* (2013.01); *G06F 2221/034* (2013.01)

(58) Field of Classification Search
CPC ......... G06F 21/554; G06F 21/85; G06F 21/71
See application file for complete search history.

(56) References Cited

U.S. PATENT DOCUMENTS

| | | | |
|---|---|---|---|
| 4,654,846 A | 3/1987 | Goodwin et al. | |
| 9,792,440 B1* | 10/2017 | Wang | H04L 63/1466 |
| 10,063,569 B2* | 8/2018 | Caprioli | H04L 63/1416 |
| 10,540,299 B2* | 1/2020 | Fanara | G06F 11/1441 |
| 10,664,413 B2* | 5/2020 | Fons | H04L 9/12 |
| 10,848,306 B2* | 11/2020 | Liu | H04L 9/003 |
| 2007/0118783 A1 | 5/2007 | Reblewski | |
| 2020/0344040 A1* | 10/2020 | Abdolee | H04L 9/0877 |
| 2020/0366294 A1* | 11/2020 | Mentens | H03K 19/20 |
| 2020/0401730 A1* | 12/2020 | Conus | G06F 9/44505 |
| 2021/0383725 A1* | 12/2021 | Dehmubed | G09F 3/0335 |

OTHER PUBLICATIONS

European Search Report and Written Opinion for the European Patent Application No. EP21183377, dated Dec. 22, 2021, 9 pages.

\* cited by examiner

*Primary Examiner* — Viral S Lakhia
(74) *Attorney, Agent, or Firm* — KDB Firm PLLC

(57) ABSTRACT

A platform comprising numerous reconfigurable circuit components arranged to operate as primary and redundant circuits is provided. The platform further comprises security circuitry arranged to monitor the primary circuit for anomalies and reconfigurable circuit arranged to disconnect the primary circuit from a bus responsive to detection of an anomaly. Furthermore, the present disclosure provides for the quarantine, refurbishment and designation as redundant, the anomalous circuit.

17 Claims, 11 Drawing Sheets

AGILE RECONFIGURABLE APPROACH FOR REAL-TIME REPLACEMENT OF ON-CHIP SAFETY-CRITICAL MODULES

BACKGROUND

Some modern computing systems provide redundancy of circuitry or functions. For example, a system-on-chip (SoC) could provide redundant compute circuitry. As such, if an error or malfunction occurs with the main compute circuitry, the redundant compute circuitry could be used. However, traditional methods for switching from the main compute circuitry can result in latency as well as cybersecurity issues.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In general, the present disclosure provides a platform comprising numerous reconfigurable circuit components arranged to operate as primary and redundant circuits. The platform further comprises security circuitry arranged to monitor the primary circuit for anomalies and reconfigurable circuit arranged to disconnect the primary circuit from a bus responsive to detection of an anomaly. Furthermore, the present disclosure provides for the quarantine, refurbishment (or reconfiguration) and designation as redundant, the anomalous circuit.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1A:
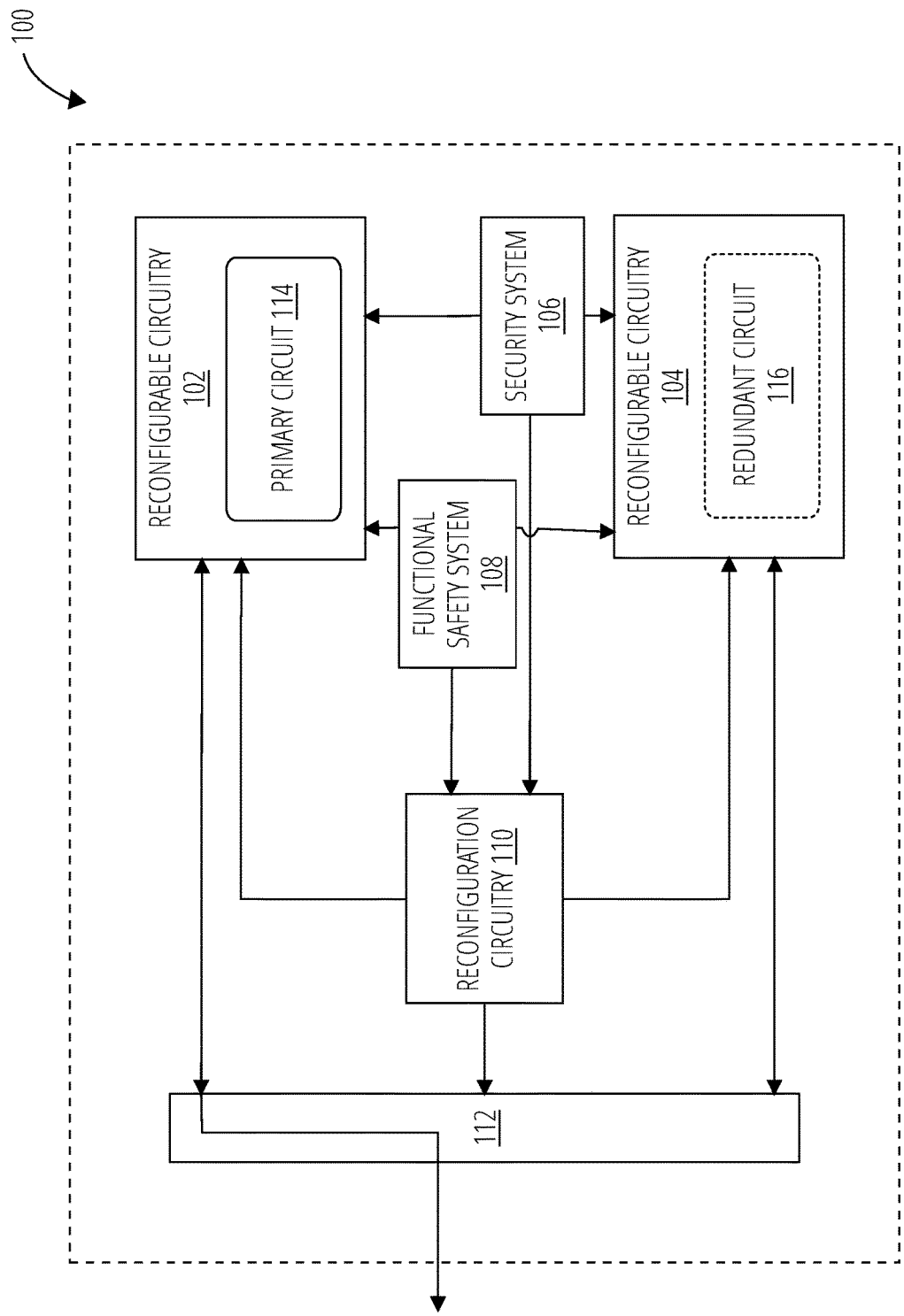
FIG. 1A illustrates an aspect of the subject matter in accordance with one embodiment.

FIG. 1A illustrates an example safety critical sub-system 100, which can be implemented in any of a variety of systems wherein functionality is safety critical. For example, safety critical sub-system 100 can be implemented in an automobile, an airplane, a train, a factory, a space system, military systems, or the like. Safety critical sub-system 100 includes a number of reconfigurable circuits. For example, reconfigurable circuitry 102 and reconfigurable circuitry 104 are depicted. It is noted that more than two reconfigurable circuits could be provided. For example, with some applications triple redundancy may be mandated by regulation (e.g., aerospace, or the like). As such, safety critical sub-system 100 could include three (not shown) reconfigurable circuits like reconfigurable circuitry 102 and/or reconfigurable circuitry 104.

Safety critical sub-system 100 further includes a security system 106, functional safety system 108, reconfiguration circuitry 110 and bus 112. During operation, one of reconfigurable circuits is the primary circuit 114 while the other is the redundant circuit 116. Said differently, one of the reconfigurable circuits operates at one time while the other reconfigurable circuit (or circuits as may be the case) is a redundant backup to the operational circuit. For example, reconfigurable circuitry 102 is depicted as the primary circuit 114 while reconfigurable circuitry 104 is depicted as the redundant circuit 116. During operation, the reconfigurable circuit acting as the primary circuit 114 is operatively and/or communicatively coupled to another component, device, or system, via the bus 112.

Security system 106 and/or functional safety system 108 is arranged to monitor operation of the active reconfigurable circuit. For example as depicted in this figure, security system 106 and/or functional safety system 108 are arranged to monitor operation of reconfigurable circuitry 102 (as the primary circuit 114). In general, security system 106 and/or functional safety system 108 monitor operation of the active reconfigurable circuit to detect anomaly, faults, errors, intrusions, or otherwise malicious or malfunctioning behavior. Note, that here, such behavior, errors, faults, intrusions, or the like are all referred to generally as anomalies. With some examples, security system 106 and functional safety system 108 can be combined into a single system (e.g., see FIG. 4). In other examples (e.g., as depicted) security system 106 and functional safety system 108 are distinct circuits or systems. Examples of security system 106 and/or functional safety system 108 are given in greater detail below.

Security system 106 and/or functional safety system 108 are operably coupled to reconfiguration circuitry 110. Reconfiguration circuitry 110 is operably coupled to the reconfigurable circuits, such as, reconfigurable circuitry 102 and reconfigurable circuitry 104. Security system 106 and/or functional safety system 108 can send a control signal, notification, or message to reconfiguration circuitry 110 comprising an indication that an anomaly has been detected.

Responsive to an indication of an anomaly detected in the primary circuit 114, reconfiguration circuitry 110 can disconnect the primary circuit 114 and connect the redundant circuit 116. Said differently, reconfiguration circuitry 110 can operate to disconnect the reconfigurable circuit acting as the primary circuit 114 (e.g., reconfigurable circuitry 102) from bus 112 and connect the backup reconfigurable circuit acting as the redundant circuit 116 (e.g., reconfigurable circuitry 104) to bus 112. As such, the backup reconfigurable circuit can replace the active reconfigurable circuit upon detection of an anomaly.

Figure 1B:
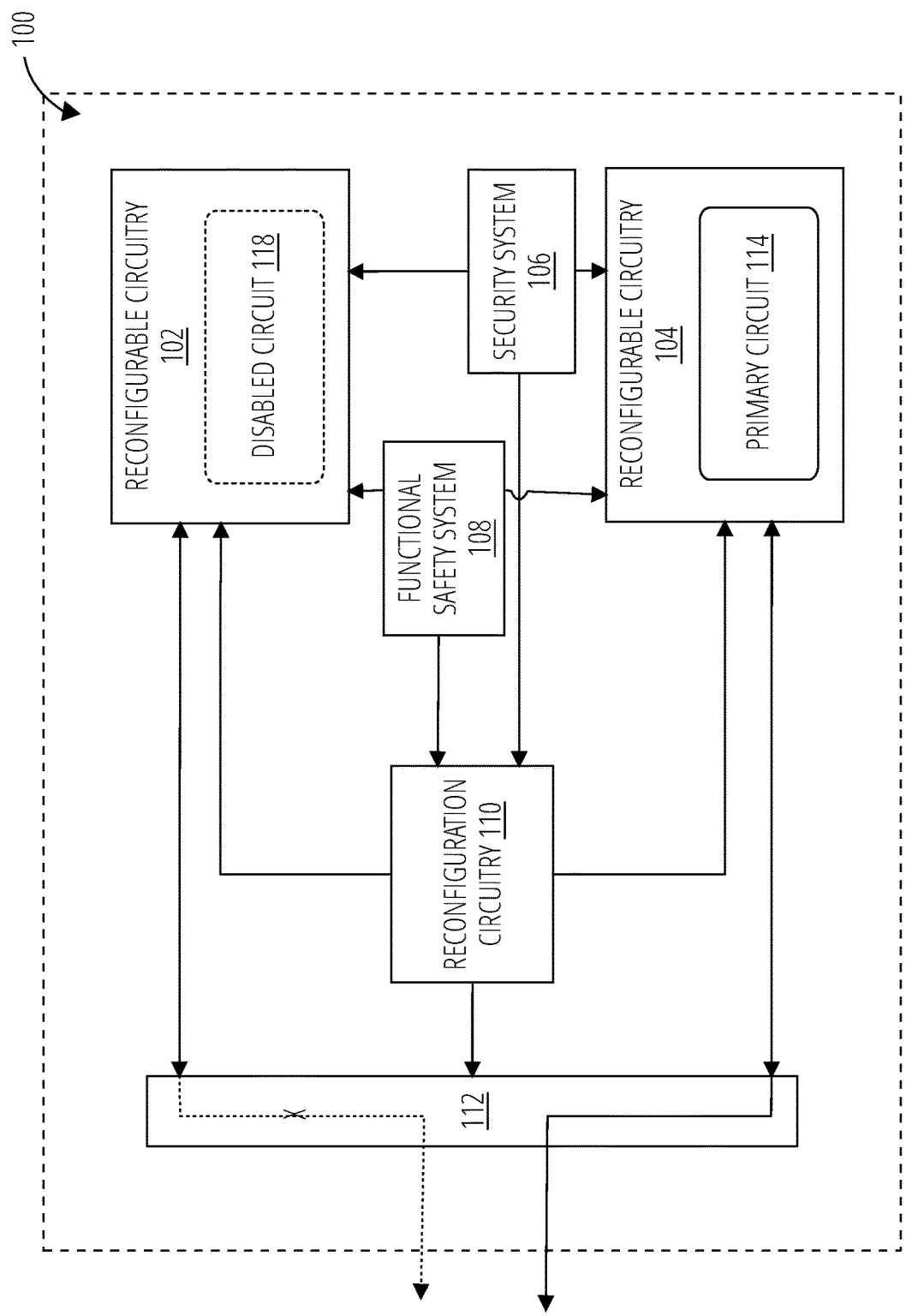
FIG. 1B illustrates an aspect of the subject matter in accordance with one embodiment.

For example, FIG. 1B depicts safety critical sub-system 100 where reconfigurable circuitry 104 has been activated.

Said differently, reconfigurable circuitry 104 has been configured, by reconfiguration circuitry 110, to operate as the primary circuit 114. Similarly, reconfigurable circuitry 102 has been deactivated, or disabled. For example, reconfigurable circuitry 102 is depicted in FIG. 1B as the disabled circuit 118. Additionally, the connection of reconfigurable circuitry 102 (e.g., the disabled circuit 118) through bus 112 has been disconnected while the connection of reconfigurable circuitry 104 (e.g., the primary circuit 114) has been enabled, or connected.

Figure 1C:
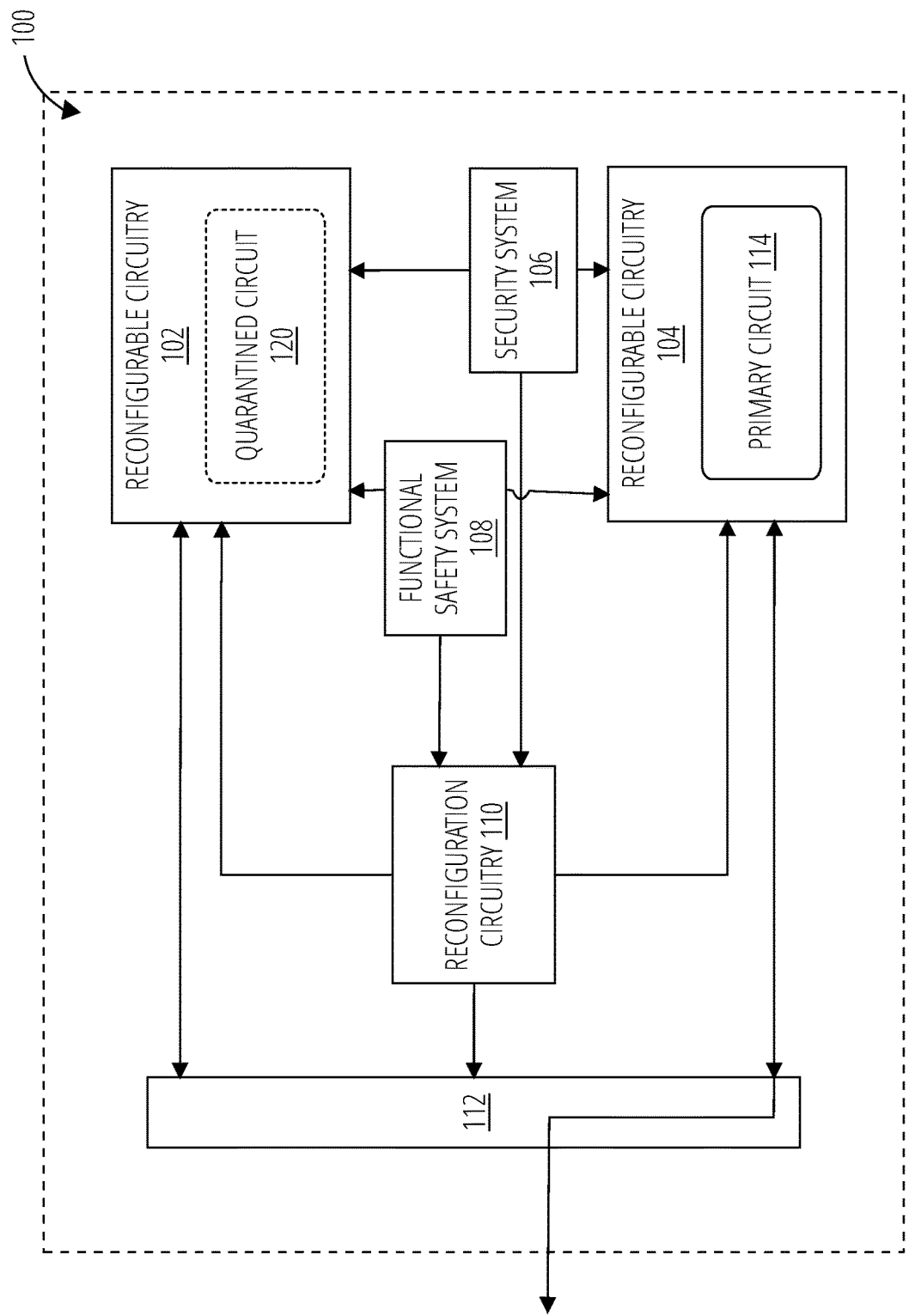
FIG. 1C illustrates an aspect of the subject matter in accordance with one embodiment.

With some implementations, reconfiguration circuitry 110 can be arranged to quarantine reconfigurable circuits where anomalies were detected. For example, FIG. 1C depicts safety critical sub-system 100 where reconfigurable circuitry 102 has been quarantined. That is, reconfigurable circuitry 102 is the quarantined circuit 120. Reconfiguration circuitry 110 can be arranged to inspect, monitor, test, or otherwise analyze the quarantined circuit 120 (e.g., reconfigurable circuitry 102) to determine the cause or source of the anomaly.

Figure 1D:
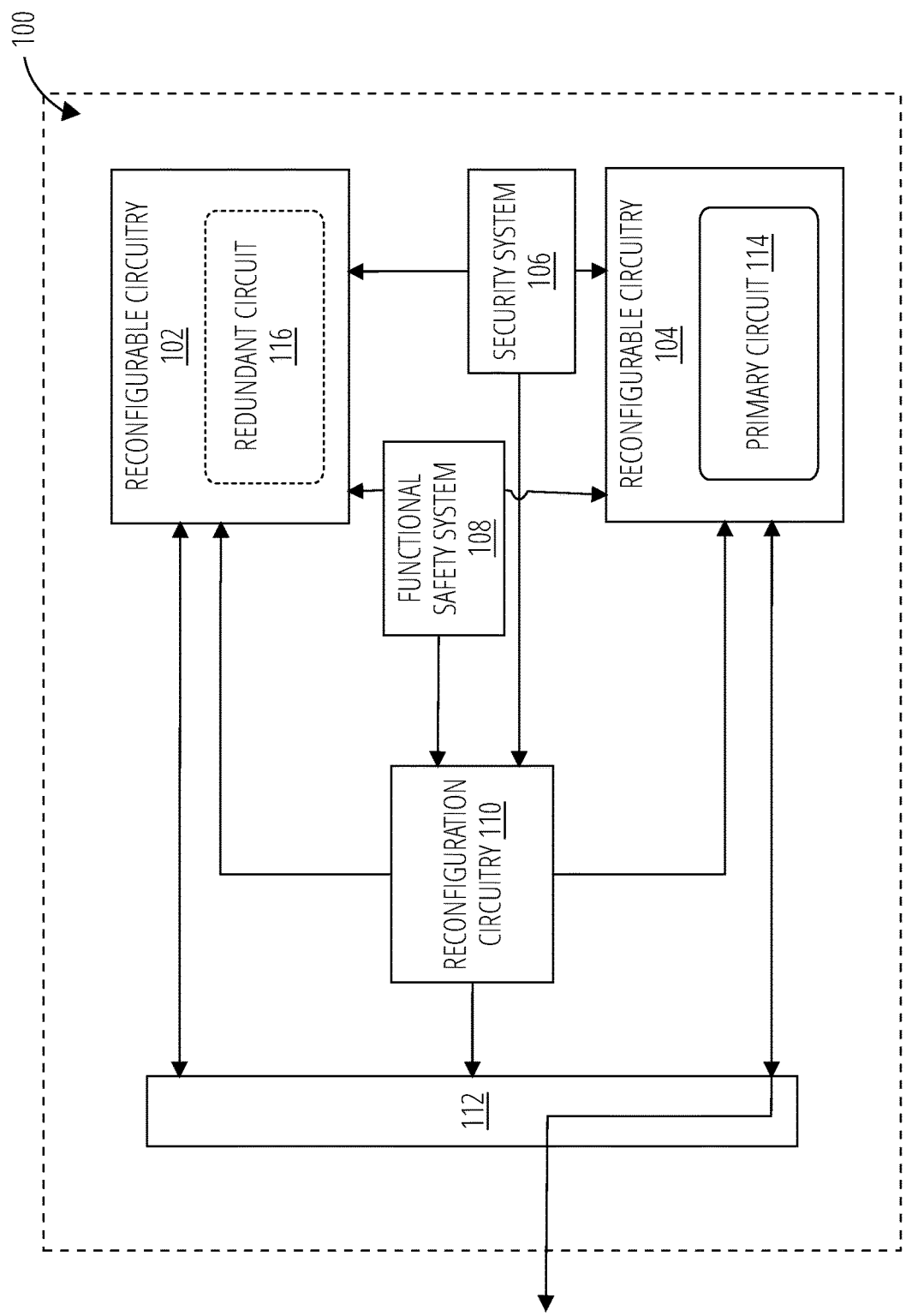
FIG. 1D illustrates an aspect of the subject matter in accordance with one embodiment.

Reconfiguration circuitry 110 can further be arranged to refurbish the quarantined circuit 120 such that the reconfigurable circuit that has been quarantined (e.g., 102) can be brought back as the redundant circuit 116. For example, FIG. 1D depicts reconfigurable circuitry 102 as the redundant circuit 116.

Figure 2:
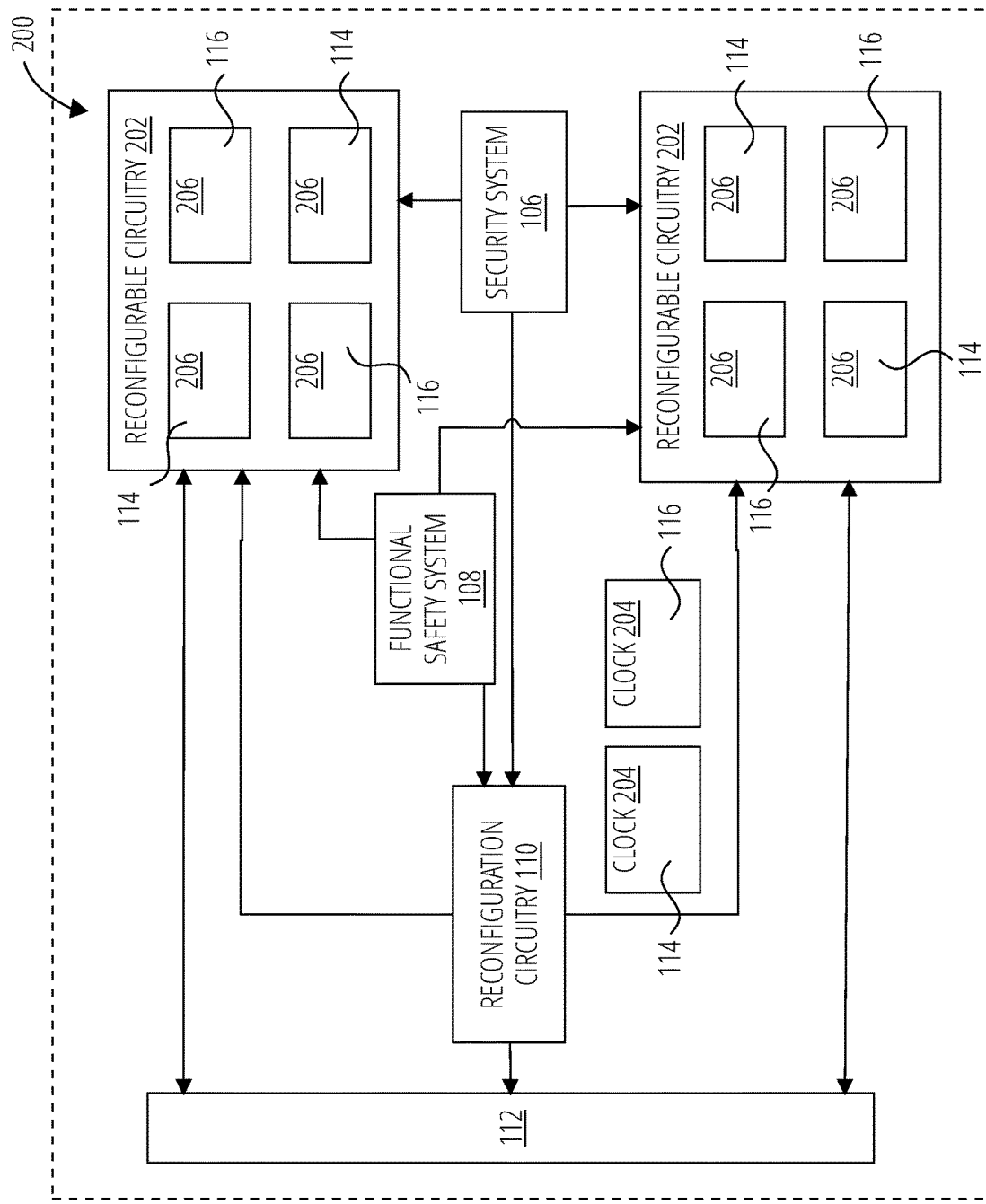
FIG. 2 illustrates an aspect of the subject matter in accordance with one embodiment.

FIG. 2 illustrates an example safety critical sub-system 200, which can be implemented in any of a variety of systems wherein functionality is safety critical. Safety critical sub-system 200 can include features of safety critical sub-system 100 described above. However, as depicted and described herein, safety critical sub-system 200 can include multiple levels and/or granularities of redundancy. For example, safety critical sub-system 200 includes reconfigurable circuits 202, including reconfigurable cores 206. Reconfigurable core 206 within reconfigurable circuits 202 can be monitored, activated, deactivated, and reconfigured, as described with respect to reconfigurable circuitry 102 and reconfigurable circuitry 104 above. In particular, safety critical sub-system 200 includes security system 106, functional safety system 108, and reconfiguration circuitry 110 as described above. In particular, individual ones of reconfigurable cores 206 within reconfigurable circuitry 202 can be designated as primary circuit 114, quarantined, refurbished, and designated as redundant circuit 116. More specifically, a one of reconfigurable cores 206 of reconfigurable circuitry 202 can be designated as a primary circuit 114 while another one of reconfigurable cores 206 of the same reconfigurable circuitry 202 can be designated as a redundant circuit 116.

Furthermore, safety critical sub-system 200 can include redundant circuitry for platform level components, such as, clocks. For example, reconfigurable clock circuitry 204 is depicted where one of reconfigurable clock circuitry 204 is designated as primary circuit 114 and the other reconfigurable clock circuitry 204 is designated as redundant circuit 116.

In general, the reconfigurable circuits (e.g., reconfigurable circuitry 102, reconfigurable circuitry 104, etc.) can be any reconfigurable or reprogrammable circuit, such as, for example, a field programmable gate array (FPGA), a programmable logic device (PLD). For example, FIG. 3 illustrates an example reconfigurable circuit 300, which could be implemented as reconfigurable circuitry 102 and reconfigurable circuitry 104 of safety critical sub-system 100.

Reconfigurable circuit 300 includes refurbish-able circuitry 302 and, optionally, processing circuitry 304. Refurbish-able circuitry 302 can be programmable circuitry (e.g., FPGA circuitry, or the like) or can be memory. For example, refurbish-able circuitry 302 could be based on any of a wide variety of information storage technologies, such as, erasable programmable ROM (EPROM), electrically erasable programmable ROM (EEPROM), or the like.

Figure 3:
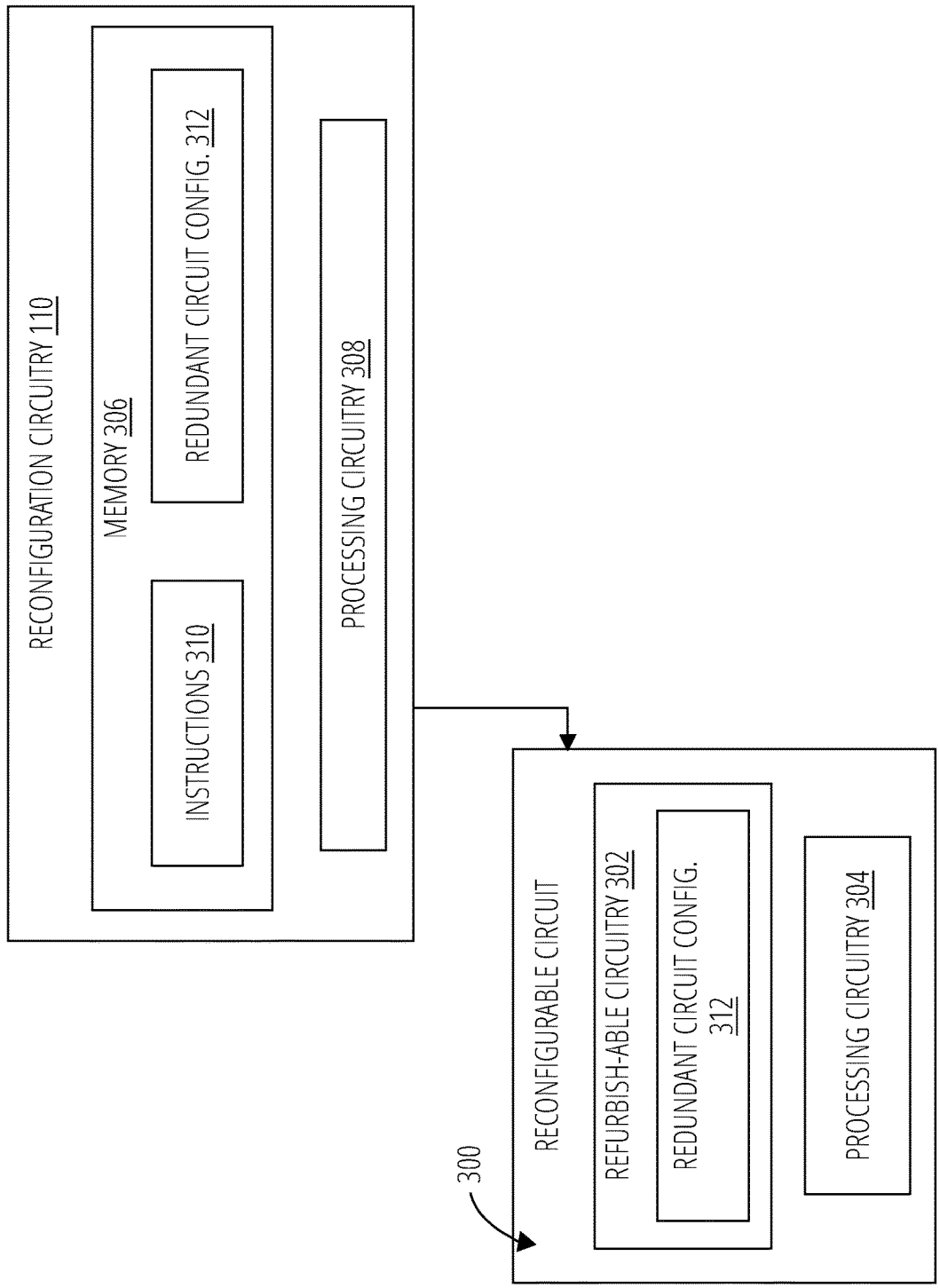
FIG. 3 illustrates a reconfigurable circuit 300 for a safety critical sub-system.

FIG. 3 also depicts an example of reconfiguration circuitry 110. As depicted, reconfiguration circuitry 110 includes memory 306 and processing circuitry 308. Memory 306 includes instructions 310 and redundant circuit configuration 312.

Refurbishment reflects the aspect that an unit was compromised (e.g. attacker exploited a vulnerability), but was brought back to an authentic state. After refurbishment, a reset may be needed. Now, refurbishing is based on a golden reference that we have and if that reference didn't change, the attacker can again explore the existing vulnerability, of course. But for a period of time it (until a new compromise happens) it is still authentic—in the case of the reset, the module is never again authentic.

Memory 306 can be based on any of a wide variety of information storage technologies. For example, memory 306 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 306 can include storage devices.

Processing circuitry 308, and where includes, processing circuitry 304, can include any of a variety of processors, such as, for example, commercial central processing units, application specific integrated circuits, or the like. Processing circuitry 308 and/or processing circuitry 304 can be a microprocessor or a commercial processor and can include one or multiple processing core(s) and can also include cache.

Processing circuitry 308 can execute instructions 310 to activate reconfigurable circuit 300. For example, processing circuitry 308 can execute instructions 310 to connect reconfigurable circuit 300 to a bus (e.g., bus 112, or the like) and designate reconfigurable circuit 300 as the active, or the primary circuit 114.

Additionally, processing circuitry 308 is arranged to execute instructions 310 to deactivate reconfigurable circuit 300. For example, processing circuitry 308 can execute instructions 310 to receive indications of anomalies detected with respect to reconfigurable circuit 300. Further, processing circuitry 308 can execute instructions 310 to disconnect reconfigurable circuit 300 from a bus (e.g., bus 112, or the like), to quarantine reconfigurable circuit 300, and to refurbish reconfigurable circuit 300 to a default state such that reconfigurable circuit 300 can be activated as the redundant circuit in a safety critical system (e.g., as the redundant circuit 116 in safety critical sub-system 100, or the like).

With some examples, processing circuitry 308 can execute instructions 310 to refurbish refurbish-able circuitry 302 to a default state based on redundant circuit configuration 312. As a specific example, processing circuitry 308 can execute instructions 310 to erase and reprogram refurbishable circuitry 302 based on redundant circuit configuration 312. As another specific example, processing circuitry 308 can execute instructions 310 to reconfigure refurbish-able circuitry 302 to a default circuit configuration or state based on redundant circuit configuration 312.

Where refurbish-able circuitry 302 is reconfigurable circuit, reconfigurable circuit 300 may not include processing circuitry 304. In such an example, refurbish-able circuitry 302 may operate to execute or process functions defined by redundant circuit configuration 312. Where refurbish-able circuitry 302 is erasable or reconfigurable memory (e.g., EEPROM, or the like), reconfigurable circuit 300 may include processing circuitry 304 where processing circuitry 304 can be arranged to execute redundant circuit configuration 312. In such an example, redundant circuit configuration 312 could be processor circuit executable instructions (e.g., firmware, or the like).

Figure 4:
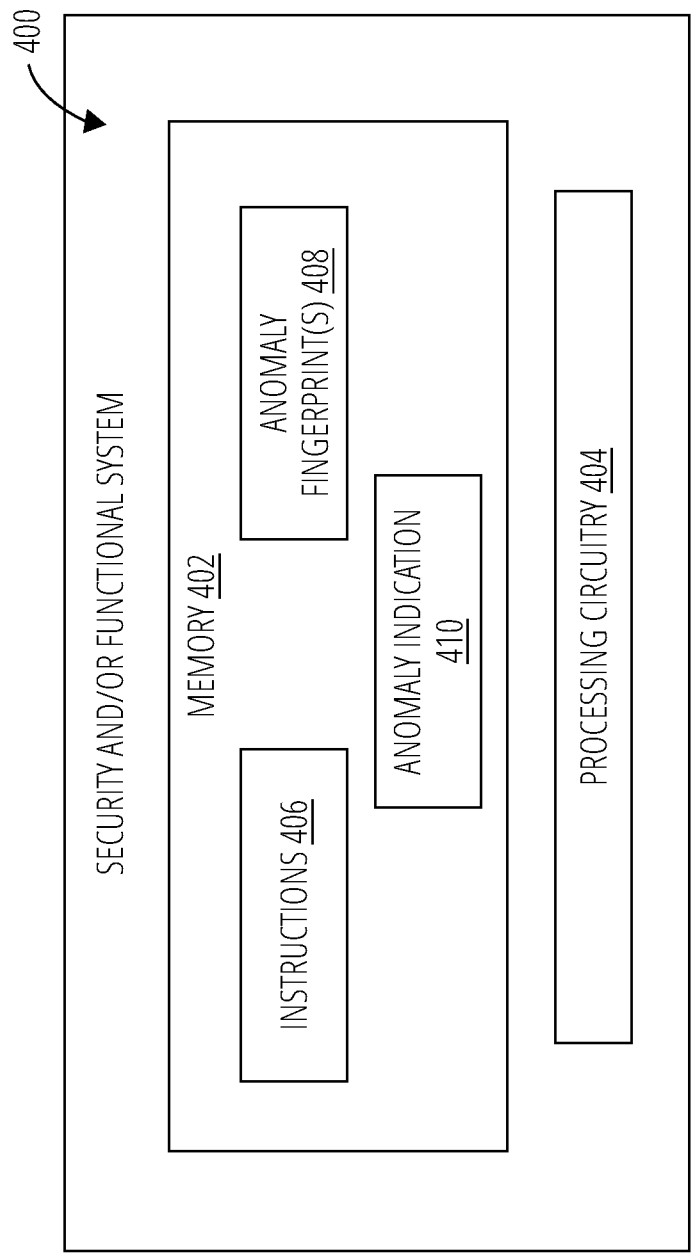
FIG. 4 illustrates a system 400 to monitor reconfigurable circuitry as described herein.

FIG. 4 illustrates an example system 400 that can be implemented as the security system 106 of safety critical sub-system 100, the functional safety system 108 of safety critical sub-system 100, or both the security system 106 and the functional safety system 108 of safety critical sub-system 100.

System 400 includes memory 402 and processing circuitry 404. Memory 402 includes instructions 406, anomaly fingerprint 408, and anomaly indication 410.

During operation, processing circuitry 404 can execute instructions 406 to monitor reconfigurable circuits (e.g., reconfigurable circuitry 102, reconfigurable circuitry 104, reconfigurable circuit 300, or the like) for anomalies. For example, system 400 could be an intrusion detection system (IDS) arranged to monitor reconfigurable circuits to detect anomalies based on anomaly fingerprints 408.

Processing circuitry 404 can execute instructions 406 to generate anomaly indication 410 comprising an indication of the detected anomaly and send anomaly indication 410 to a reconfiguration circuit (e.g., reconfiguration circuitry 110 of safety critical sub-system 100, or the like).

Memory 402 can be based on any of a wide variety of information storage technologies. For example, memory 402 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 402 can include storage devices.

Processing circuitry 404, can include any of a variety of processors, such as, for example, commercial central processing units, application specific integrated circuits, or the like. Processing circuitry 404 can be a microprocessor or a commercial processor and can include one or multiple processing core(s) and can also include cache.

Figure 5:
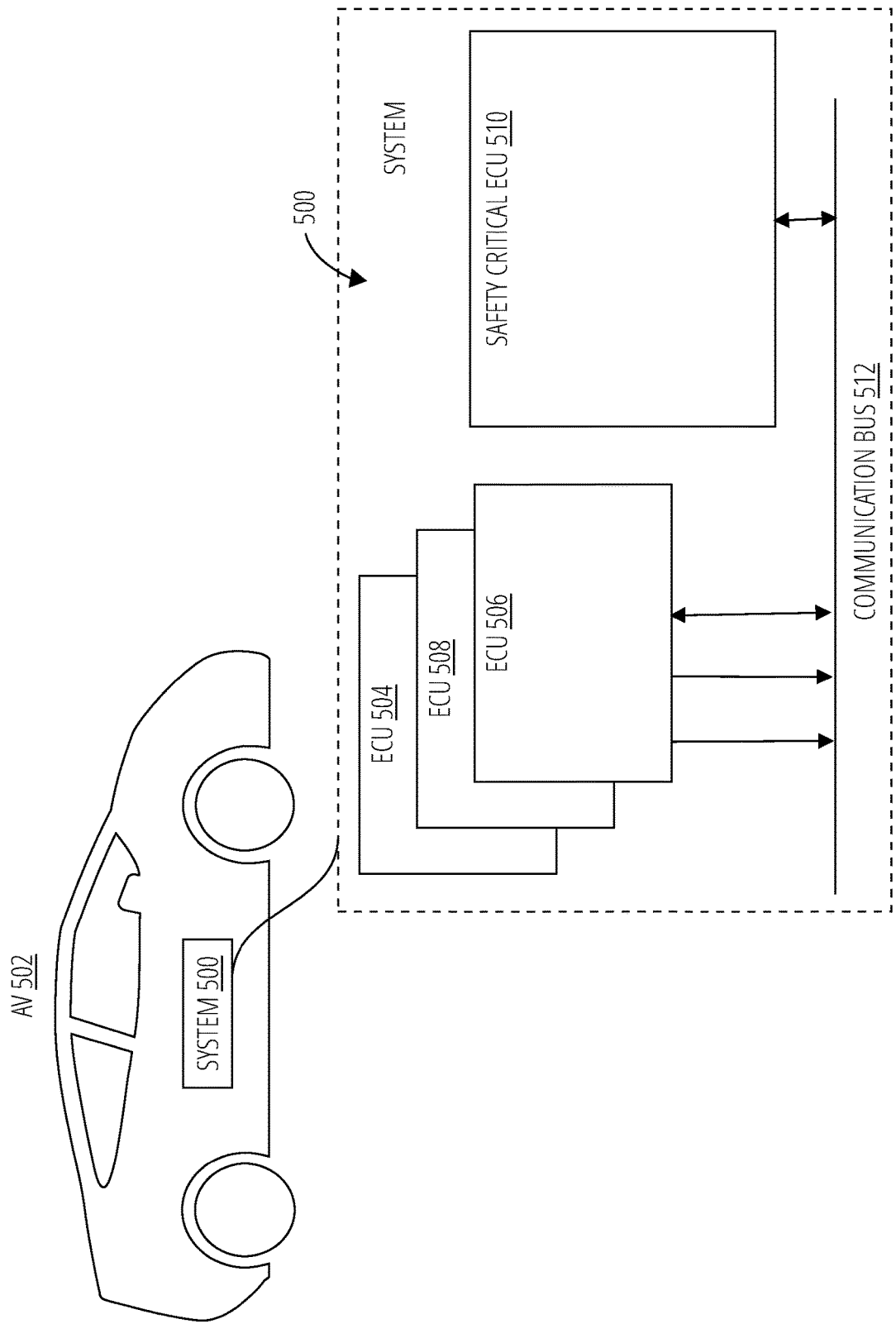
FIG. 5 illustrates a system 500 for an autonomous vehicle including a safety critical sub-system.

FIG. 5 illustrates an example system 500, which can be implemented in any of a variety of contexts. For example, system 500 could be implemented in an automobile, such as, an autonomous vehicle, in aerospace, such as, in an airplane, a drone, or the like. Example are not limited in this context. System 500 is particularly described with respect to an autonomous vehicle 502. However, this is done for purposes of explanation and clarity only.

Autonomous vehicle 502 can include 400, which itself can include a number of electronic control units (ECUs), for example, ECU 504, ECU 506, ECU 508, and a safety critical ECU 510 are depicted. ECU 504, ECU 506, ECU 508, and safety critical ECU 510 are communicatively coupled via a communication bus 512. Communication bus 512 can be an in-vehicle network (IVN), such as, a CAN bus, a FlexRay bus, a CAN FD bus, an automotive ethernet bus, or a local interconnected network (LIN) bus. Additionally, where implemented in contexts outside of the automotive space, the communication bus 512 can be a network bus adapted to the particular implementation, such as, for example, a communication network for manufacturing equipment, or the like.

In general, each of ECU 504, ECU 506, ECU 508, and safety critical ECU 510 include circuitry arranged to generate messages and transmit the messages onto communication bus 512 and/or consume messages from communication bus 512. The depicted ECUs (e.g., ECU 504, ECU 506, ECU 508, and safety critical ECU 510) can be any of a variety of devices, such as, for example, sensor devices, actuator devices, microprocessor control devices, or the like. In particular examples, ECUs (e.g., ECU 504, ECU 506, ECU 508, and safety critical ECU 510) can be ECUs for use in autonomous vehicle 502. It is to be appreciated, that a number of ECUs implemented in autonomous vehicle 502 may be safety critical, such as, for example, assisted braking ECUs, lane keeping ECUs, or the like. Such safety critical ECUs can be implemented as safety critical ECU 510. Safety critical ECU 510 can include features, circuitry, and/or functionality of the safety critical sub-system 100 and/or reconfigurable circuit 300.

Figure 6:
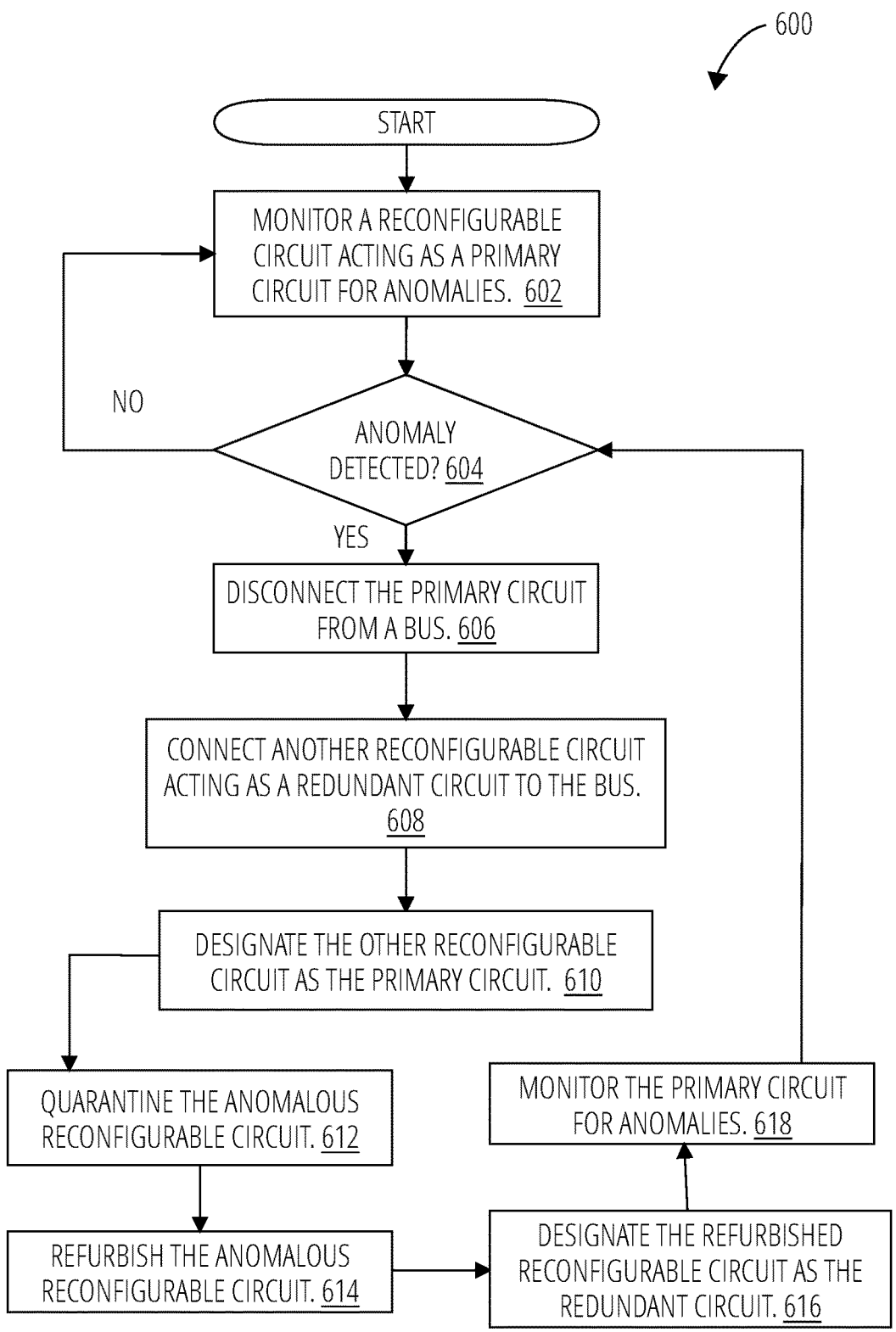
FIG. 6 illustrates a logic flow in accordance with one embodiment.

FIG. 6 illustrates a logic flow 600, which can be implemented by a safety critical sub-system, such as safety critical sub-system 100. The logic flows described herein, including logic flow 600 and other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Logic flow 600 may begin at block 602. At block 602 "monitor a reconfigurable circuit acting as a primary circuit for anomalies" circuitry can monitor a reconfigurable circuit acting as a primary circuit for anomalies. For example, security system 106 and/or functional safety system 108 can monitor reconfigurable circuitry 102, as reconfigurable circuitry 102 is acting as primary circuit 114 (e.g., refer to FIG. 1A, or the like). As a specific example, processing circuitry 404 can execute instructions 406 to monitor reconfigurable circuitry (e.g., reconfigurable circuitry 102, or the like).

Continuing to decision block 604 "anomaly detected?" circuitry can determine whether an anomaly has been detected. For example, security system 106 and/or functional safety system 108 can determine whether an anomaly has been detected in the monitored reconfigurable circuit (e.g., the primary circuit 114). With some examples, responsive to detection of an anomaly, the circuitry can send an indication of the detected anomaly to reconfiguration circuitry (e.g., reconfiguration circuitry 110). From decision block 604, logic flow 600 can continue to block 606 or return to block 602. In particular, logic flow 600 can continue to block 606 based on a determination at decision block 604 that an anomaly has been detected while logic flow 600 can return to block 602 based on a determination at decision block 604 that an anomaly has not been detected.

At block 606 "disconnect the primary circuit from a bus" circuitry can disconnect the primary circuit from a bus. More specifically, the circuitry can disconnect the reconfigurable circuit that is acting as the primary circuit from a bus. For example, reconfiguration circuitry 110 can disconnect reconfigurable circuitry 102 (e.g., acting as primary circuit 114) from bus 112 (e.g., as depicted in FIG. 1B).

Continuing to block 608 "connect another reconfigurable circuit acting as a redundant circuit to the bus" circuitry can connect another reconfigurable circuit, which is acting as a redundant circuit, to the bus. For example, reconfiguration circuitry 110 can connect reconfigurable circuitry 104 (e.g., acting as redundant circuit 116) to bus 112 (e.g., as depicted in FIG. 1B). Continuing to block 610 "designate the other reconfigurable circuit as the primary circuit" circuitry can designate the redundant circuit as the primary circuit. For example, reconfiguration circuitry 110 can designate reconfigurable circuitry 104 as the primary circuit 114 (e.g., as depicted in FIG. 1B).

Continuing to block 612 "quarantine the anomalous reconfigurable circuit" circuitry can quarantine the anomalous reconfigurable circuit. For example, reconfiguration circuitry 110 can quarantine reconfigurable circuitry 102 (e.g., as depicted in FIG. 1C). Continuing to block 614 "refurbish the anomalous reconfigurable circuit" circuitry can refurbish the anomalous reconfigurable circuit to a default state. For example, reconfiguration circuitry 110 can refurbish reconfigurable circuitry 102 to a default state (e.g., based on redundant circuit configuration 312, based on an update to redundant circuit configuration 312, or the like). Continuing to block 616 "designate the refurbished reconfigurable circuit as the redundant circuit" circuitry can designate the refurbished reconfigurable circuit as the redundant circuit. For example, reconfiguration circuitry 110 can designate reconfigurable circuitry 102 as the redundant circuit 116 (e.g., as depicted in FIG. 1D).

Continuing to block 618 "monitor the primary circuit for anomalies" circuitry can monitor the primary circuit for anomalies. For example, security system 106 and/or functional safety system 108 can monitor reconfigurable circuitry 104, as reconfigurable circuitry 104 is acting as primary circuit 114 (e.g., refer to FIG. 1D). As a specific example, processing circuitry 404 can execute instructions 406 to monitor reconfigurable circuitry (e.g., reconfigurable circuitry 104, or the like). Logic flow 600 can continue at decision block 604.

Figure 7:
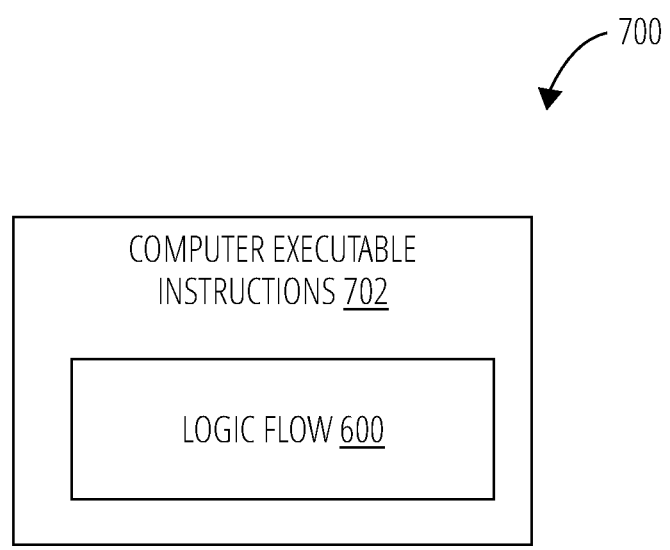
FIG. 7 illustrates a computer-readable storage medium 700 in accordance with one embodiment.

FIG. 7 illustrates computer-readable storage medium 700. Computer-readable storage medium 700 may comprise any non-transitory computer-readable storage medium or machine-readable storage medium, such as an optical, magnetic or semiconductor storage medium. In various embodiments, computer-readable storage medium 700 may comprise an article of manufacture. In some embodiments, computer-readable storage medium 700 may store computer executable instructions 702 with which circuitry (e.g., processing circuitry 308, processing circuitry 404, or the like) can execute. For example, computer executable instructions 702 can include instructions to implement operations described with respect to logic flow 600. Examples of computer-readable storage medium 700 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 702 may include any suitable type of code, such as source code, compiled code, interpreted code, executable code, static code, dynamic code, object-oriented code, visual code, and the like.

Figure 8:
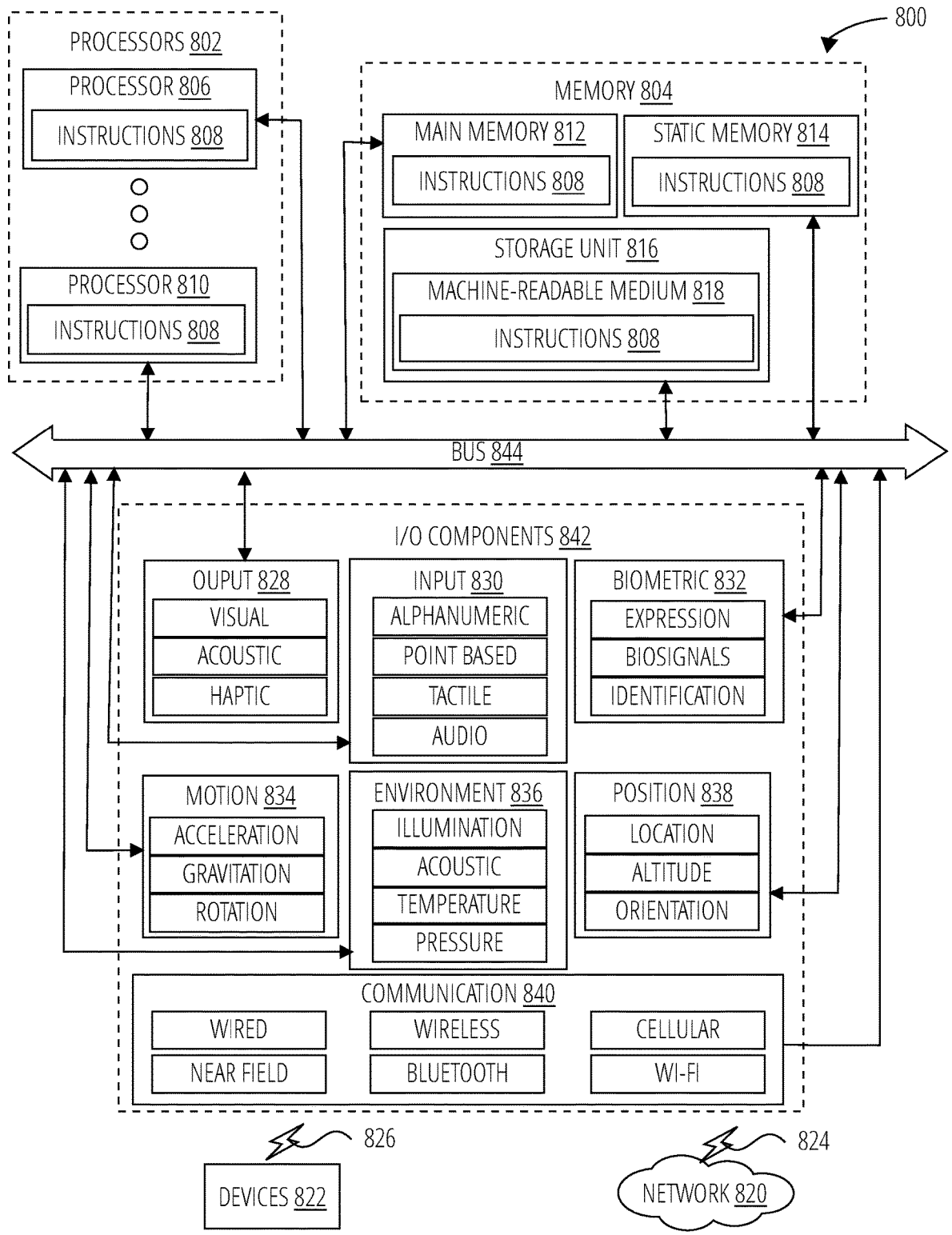
FIG. 8 illustrates a diagrammatic representation of a machine 800 in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine to perform any one or more of the methodologies discussed herein. More specifically, FIG. 8 shows a diagrammatic representation of the machine 800 in the example form of a computer system, within which instructions 808 (e.g., software, a program, an application, an applet, an app, or other executable code) for causing the machine 800 to perform any one or more of the methodologies discussed herein may be executed. For example the instructions 808 may cause the machine 800 to execute logic flow 600 of FIG. 6, or the like. More generally, the instructions 808 may cause the machine 800 to monitor reconfigurable circuitry and switch between primary and redundant circuits and responsive to anomalies, and recover anomalous circuits, as described herein.

The instructions 808 transform the general, non-programmed machine 800 into a particular machine 800 programmed to carry out the described and illustrated functions in a specific manner. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines 800 that individually or jointly execute the instructions 808 to perform any one or more of the methodologies discussed herein.

The machine 800 may include processors 802, memory 804, and I/O components 842, which may be configured to communicate with each other such as via a bus 844. In an example embodiment, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 806 and a processor 810 that may execute the instructions 808. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single core, a single processor with multiple cores (e.g., a multi-core processor), multiple processors with a single core, multiple processors with multiples cores, or any combination thereof.

The components of machine 800 can be included in a device (e.g., mobile device, or the like) implemented on a single chip, such as, a system-on-chip (SoC), or the like. For example, processors 802, memory 804, I/O components 842, and other components (e.g., a GPU, a VPU, a machine learning accelerator, or the like) can be implemented in an SoC and included in machine 800.

The memory 804 may include a main memory 812, a static memory 814, and a storage unit 816, both accessible to the processors 802 such as via the bus 844. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the processor's cache memory), or any suitable combination thereof, during execution thereof by the machine 800.

The I/O components 842 may include a wide variety of components to receive input, provide output, produce output, transmit information, exchange information, capture measurements, and so on. The specific I/O components 842 that are included in a particular machine will depend on the type of machine. For example, portable machines such as mobile phones will likely include a touch input device or other such input mechanisms, while a headless server machine will likely not include such a touch input device. It will be appreciated that the I/O components 842 may include many other components that are not shown in FIG. 8. The I/O components 842 are grouped according to functionality merely for simplifying the following discussion and the grouping is in no way limiting. In various example embodiments, the I/O components 842 may include output components 828 and input components 830. The output components 828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 842 may include biometric components 832, motion components 834, environmental components 836, or position components 838, among a wide array of other components. For example, the biometric components 832 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 842 may include communication components 840 operable to couple the machine 800 to a network 820 or devices 822 via a coupling 824 and a coupling 826, respectively. For example, the communication components 840 may include a network interface component or another suitable device to interface with the network 820. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

The various memories (i.e., memory 804, main memory 812, static memory 814, and/or memory of the processors 802) and/or storage unit 816 may store one or more sets of instructions and data structures (e.g., software) embodying or utilized by any one or more of the methodologies or functions described herein. These instructions (e.g., the instructions 808), when executed by processors 802, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 820 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 820 or a portion of the network 820 may include a wireless or cellular network, and the coupling 824 may be a Code Division Multiple Access (CDMA) connection, a Global System for Mobile communications (GSM) connection, or another type of cellular or wireless coupling. In this example, the coupling 824 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 808 may be transmitted or received over the network 820 using a transmission medium via a network interface device (e.g., a network interface component included in the communication components 840) and utilizing any one of a number of well-known transfer protocols (e.g., hypertext transfer protocol (HTTP)). Similarly, the instructions 808 may be transmitted or received using a transmission medium via the coupling 826 (e.g., a peer-to-peer coupling) to the devices 822. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 808 for execution by the machine 800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Terms used herein should be accorded their ordinary meaning in the relevant arts, or the meaning indicated by their use in context, but if an express definition is provided, that meaning controls.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

The following examples pertain to further embodiments, from which numerous permutations and configurations will be apparent.

Example 1. A apparatus for a safety critical electronic control unit, comprising: a plurality of reconfigurable circuits; a security circuit coupled to the plurality of reconfigurable circuits, the security circuit arranged to: monitor a first reconfigurable circuit of the plurality of reconfigurable circuits for an anomaly, the first reconfigurable circuit designated as a primary circuit, and determine whether an anomaly has been detected; and a reconfiguration circuit coupled to the security circuit and the plurality of reconfigurable circuits, the reconfiguration circuit arranged to: disconnect the first reconfigurable circuit from a bus responsive to a determination that an anomaly has been detected, connect a second reconfigurable circuit of the plurality of reconfigurable circuits to the bus, the second reconfiguration circuit designated as a redundant circuit, and designate the second reconfigurable circuit as the primary circuit.

Example 2. The apparatus of example 1, the reconfiguration circuit arranged to quarantine the first reconfigurable circuit.

Example 3. The apparatus of example 2, the reconfiguration circuit arranged to: refurbish the first reconfigurable circuit to a default state; and designate the first reconfigurable circuit as the redundant circuit.

Example 4. The apparatus of example 3, the reconfiguration circuit arranged to update the default state prior to refurbishing the first reconfigurable circuit.

Example 5. The apparatus of example 1, the security circuit arranged to monitor the second reconfigurable circuit of the plurality of reconfigurable circuits for an anomaly.

Example 6. A system, comprising: an in-vehicle network (IVN); a plurality of electronic control units coupled via the IVN; and at least one safety critical ECU coupled to the IVN, the at least one safety critical ECU comprising: a plurality of reconfigurable circuits; a security circuit coupled to the plurality of reconfigurable circuits, the security circuit arranged to: monitor a first reconfigurable circuit of the plurality of reconfigurable circuits for an anomaly, the first reconfigurable circuit designated as a primary circuit, and determine whether an anomaly has been detected; and a reconfiguration circuit coupled to the security circuit and the plurality of reconfigurable circuits, the reconfiguration circuit arranged to: disconnect the first reconfigurable circuit from a bus responsive to a determination that an anomaly has been detected, connect a second reconfigurable circuit of the plurality of reconfigurable circuits to the bus, the second reconfiguration circuit designated as a redundant circuit, and designate the second reconfigurable circuit as the primary circuit.

Example 7. The system of example 6, the reconfiguration circuit arranged to quarantine the first reconfigurable circuit.

Example 8. The system of example 7, the reconfiguration circuit arranged to: refurbish the first reconfigurable circuit to a default state; and designate the first reconfigurable circuit as the redundant circuit.

Example 9. The system of example 8, the reconfiguration circuit arranged to update the default state prior to refurbishing the first reconfigurable circuit.

Example 10. The system of example 6, the security circuit arranged to monitor the second reconfigurable circuit of the plurality of reconfigurable circuits for an anomaly.

Example 11. The system of example 6, wherein the IVN is a CAN bus, a FlexRay bus, a CAN FD bus, an automotive ethernet bus, or a local interconnected network (LIN) bus.

Example 12. The system of example 6, wherein the system is implemented in an autonomous vehicle.

Example 13. The system of example 12, wherein the safety critical ECU comprises a lane keeping ECU or an assisted braking ECU.

Example 14. A non-transitory computer-readable storage medium, the computer-readable storage medium including instructions that when executed by a platform computing device, cause the platform computing device to: monitor, for an anomaly via security circuitry of the platform computing device, a first reconfigurable circuit of a plurality of reconfigurable circuits of the platform computing device, the first reconfigurable circuit designated as a primary circuit; determine whether an anomaly has been detected; disconnect, via reconfiguration circuitry of the platform computing device, the first reconfigurable circuit from a bus responsive to a determination that an anomaly has been detected; connect, via the reconfiguration circuitry, a second reconfigurable circuit of the plurality of reconfigurable circuits to the bus, the second reconfiguration circuit designated as a redundant circuit; and designate, via the reconfiguration circuitry, the second reconfigurable circuit as the primary circuit.

Example 15. The computer-readable storage medium of example 14, comprising instructions that when executed by the platform computing device, cause the platform computing device to quarantine, via the reconfiguration circuitry, the first reconfigurable circuit.

Example 16. The computer-readable storage medium of example 15, comprising instructions that when executed by the platform computing device, cause the platform computing device to: refurbish, via the reconfiguration circuitry, the first reconfigurable circuit to a default state; and designate, via the reconfiguration circuitry, the first reconfigurable circuit as the redundant circuit.

Example 17. The computer-readable storage medium of example 14, comprising instructions that when executed by the platform computing device, cause the platform computing device to update the default state prior to refurbishing the first reconfigurable circuit.

Example 18. The computer-readable storage medium of example 14, comprising instructions that when executed by the platform computing device, cause the platform computing device to monitor, for an anomaly via security circuitry, the second reconfigurable circuit of the plurality of reconfigurable circuits.

Example 19. The computer-readable storage medium of example 14, wherein the platform computing device is platform circuitry of an electronic control unit (ECU).

Example 20. The computer-readable storage medium of example 19, wherein the ECU is an ECU of an autonomous vehicle.

Example 21. A method, comprising: monitoring, for an anomaly via security circuitry of a platform, a first reconfigurable circuit of a plurality of reconfigurable circuits of the platform, the first reconfigurable circuit designated as a primary circuit; determine whether an anomaly has been detected; disconnect, via reconfiguration circuitry of the platform, the first reconfigurable circuit from a bus responsive to a determination that an anomaly has been detected; connect, via the reconfiguration circuitry, a second reconfigurable circuit of the plurality of reconfigurable circuits to the bus, the second reconfiguration circuit designated as a redundant circuit; and designate, via the reconfiguration circuitry, the second reconfigurable circuit as the primary circuit.

Example 22. The method of example 21, comprising quarantining, via the reconfiguration circuitry, the first reconfigurable circuit.

Example 23. The method of example 22, comprising: refurbishing, via the reconfiguration circuitry, the first reconfigurable circuit to a default state; and designating, via the reconfiguration circuitry, the first reconfigurable circuit as the redundant circuit.

Example 24. The method of example 23, comprising updating the default state prior to refurbishing the first reconfigurable circuit.

Example 25. The method of example 21, comprising monitoring, for an anomaly via security circuitry, the second reconfigurable circuit of the plurality of reconfigurable circuits.

Example 26. The method of example 21, wherein the platform is platform circuitry of an electronic control unit (ECU).

Example 27. The computer-readable storage medium of example 26, wherein the ECU is an ECU of an autonomous vehicle.

Example 28. An apparatus, comprising means arranged to implement the function of any one of examples 21 to 27.

What is claimed is:

1. A apparatus for a safety critical electronic control unit, comprising:
   a plurality of reconfigurable circuits;
   a security circuit coupled to the plurality of reconfigurable circuits, the security circuit arranged to:
      monitor a first reconfigurable circuit of the plurality of reconfigurable circuits for an anomaly, the first reconfigurable circuit designated as a primary circuit, and
      determine whether an anomaly has been detected; and
   a reconfiguration circuit coupled to the security circuit and the plurality of reconfigurable circuits, the reconfiguration circuit arranged to:
      disconnect the first reconfigurable circuit from a bus responsive to a determination that an anomaly has been detected to quarantine the first reconfigurable circuit,
      connect a second reconfigurable circuit of the plurality of reconfigurable circuits to the bus, the second reconfiguration circuit designated as a redundant circuit,
      designate the second reconfigurable circuit as the primary circuit,
      refurbish the first reconfigurable circuit to a default state, and
      designate the first reconfigurable circuit as the redundant circuit.

2. The apparatus of claim 1, the reconfiguration circuit arranged to update the default state prior to refurbishing the first reconfigurable circuit.

3. The apparatus of claim 1, the security circuit arranged to monitor the second reconfigurable circuit of the plurality of reconfigurable circuits for an anomaly.

4. A system, comprising:
   an in-vehicle network (IVN);
   a plurality of electronic control units coupled via the IVN; and
   at least one safety critical ECU coupled to the IVN, the at least one safety critical ECU comprising:
      a plurality of reconfigurable circuits;
      a security circuit coupled to the plurality of reconfigurable circuits, the security circuit arranged to:
         monitor a first reconfigurable circuit of the plurality of reconfigurable circuits for an anomaly, the first reconfigurable circuit designated as a primary circuit, and
         determine whether an anomaly has been detected; and
      a reconfiguration circuit coupled to the security circuit and the plurality of reconfigurable circuits, the reconfiguration circuit arranged to:
         disconnect the first reconfigurable circuit from a bus responsive to a determination that an anomaly has been detected to quarantine the first reconfigurable circuit,
         connect a second reconfigurable circuit of the plurality of reconfigurable circuits to the bus, the second reconfiguration circuit designated as a redundant circuit, and
         designate the second reconfigurable circuit as the primary circuit,
         refurbish the first reconfigurable circuit to a default state, and
         designate the first reconfigurable circuit as the redundant circuit.

5. The system of claim 4, the reconfiguration circuit arranged to update the default state prior to refurbishing the first reconfigurable circuit.

6. The system of claim 4, the security circuit arranged to monitor the second reconfigurable circuit of the plurality of reconfigurable circuits for an anomaly.

7. The system of claim 4, wherein the IVN is a CAN bus, a FlexRay bus, a CAN FD bus, an automotive ethernet bus, or a local interconnected network (LIN) bus.

8. The system of claim 4, wherein the system is implemented in an autonomous vehicle.

9. The system of claim 8, wherein the safety critical ECU comprises a lane keeping ECU or an assisted braking ECU.

10. A non-transitory computer-readable storage medium, the computer-readable storage medium including instructions that when executed by a platform computing device, cause the platform computing device to:
    monitor, for an anomaly via security circuitry of the platform computing device, a first reconfigurable circuit of a plurality of reconfigurable circuits of the platform computing device, the first reconfigurable circuit designated as a primary circuit;
    determine whether an anomaly has been detected;
    disconnect, via reconfiguration circuitry of the platform computing device, the first reconfigurable circuit from a bus responsive to a determination that an anomaly has been detected to quarantine the first reconfigurable circuit;
    connect, via the reconfiguration circuitry, a second reconfigurable circuit of the plurality of reconfigurable circuits to the bus, the second reconfiguration circuit designated as a redundant circuit;
    designate, via the reconfiguration circuitry, the second reconfigurable circuit as the primary circuit;
    refurbish, via the reconfiguration circuitry, the first reconfigurable circuit to a default state; and
    designate, via the reconfiguration circuitry, the first reconfigurable circuit as the redundant circuit.

11. The computer-readable storage medium of claim 10, comprising instructions that when executed by the platform computing device, cause the platform computing device to monitor, for an anomaly via security circuitry, the second reconfigurable circuit of the plurality of reconfigurable circuits.

12. The computer-readable storage medium of claim 10, wherein the platform computing device is platform circuitry of an electronic control unit (ECU).

13. The computer-readable storage medium of claim 12, wherein the ECU is an ECU of an autonomous vehicle.

14. A method, comprising:
    monitoring, for an anomaly via security circuitry of a platform, a first reconfigurable circuit of a plurality of reconfigurable circuits of the platform, the first reconfigurable circuit designated as a primary circuit;
    determine whether an anomaly has been detected;
    disconnect, via reconfiguration circuitry of the platform, the first reconfigurable circuit from a bus responsive to a determination that an anomaly has been detected to quarantine the first reconfigurable circuit;
    connect, via the reconfiguration circuitry, a second reconfigurable circuit of the plurality of reconfigurable circuits to the bus, the second reconfiguration circuit designated as a redundant circuit;
    designate, via the reconfiguration circuitry, the second reconfigurable circuit as the primary circuit;
    refurbishing, via the reconfiguration circuitry, the first reconfigurable circuit to a default state; and designating, via the reconfiguration circuitry, the first reconfigurable circuit as the redundant circuit.

15. The method of claim 14, comprising monitoring, for an anomaly via security circuitry, the second reconfigurable circuit of the plurality of reconfigurable circuits.

16. The method of claim 14, wherein the platform is platform circuitry of an electronic control unit (ECU).

17. The computer-readable storage medium of claim 16, wherein the ECU is an ECU of an autonomous vehicle.

* * * * *